United States Patent [19]
Johler

[11] Patent Number: 5,192,952
[45] Date of Patent: Mar. 9, 1993

[54] METHOD AND APPARATUS FOR TRANSMITTING ELECTROMAGNETIC SIGNALS INTO THE EARTH FROM A CAPACITOR

[76] Inventor: J. Ralph Johler, 16796 W. 74th Pl., Golden, Colo. 80403-7916

[21] Appl. No.: 713,955
[22] Filed: Jun. 11, 1991
[51] Int. Cl.[5] .................. G01S 13/04; G01V 3/12; G01V 3/38
[52] U.S. Cl. .................. 342/22; 324/323; 324/326
[58] Field of Search ............. 342/22, 27, 195; 324/323, 326, 327, 328, 332

[56] References Cited

U.S. PATENT DOCUMENTS

| | | | |
|---|---|---|---|
| 1,365,579 | 1/1921 | Appleby et al. | 342/367 |
| 2,077,707 | 4/1937 | Melton | 342/22 |
| 2,517,951 | 8/1950 | Wheeler | 342/22 X |
| 3,806,795 | 4/1974 | Morey | 324/337 |
| 3,831,173 | 8/1974 | Lerner | 342/22 |
| 3,967,282 | 6/1976 | Young et al. | 342/22 |
| 4,008,469 | 2/1977 | Chapman | 342/22 |
| 4,062,010 | 12/1977 | Young et al. | 342/22 |
| 4,126,860 | 11/1978 | Sullivan et al. | 342/22 X |
| 4,245,191 | 1/1981 | Schroeder | 342/22 X |
| 4,417,210 | 11/1983 | Rocroi et al. | 342/13 |
| 4,506,267 | 3/1985 | Harmuth | 343/744 |
| 4,651,152 | 3/1987 | Harmuth | 342/22 X |
| 4,746,867 | 5/1988 | Gunton | 342/22 X |
| 4,837,514 | 6/1989 | Spies | 324/336 |
| 4,905,008 | 2/1990 | Kawano et al. | 342/22 |
| 4,937,580 | 6/1990 | Wills | 342/22 |
| 5,051,748 | 9/1991 | Pichot et al. | 342/22 |
| 5,057,844 | 10/1991 | Rothstein | 342/51 |
| 5,113,192 | 5/1992 | Thomas | 342/22 |

OTHER PUBLICATIONS

U.S. Dept. of the Interior, Bureau of Mines, Colorado Research & Prediction Lab, Contract No. S0221103, dated Sep. 15, 1982 (a total of 4 pages).
U.S. Dept. of the Interior, Bureau of Mines, Colorado Research & Prediction Lab, Contract No. J0235001, dated Apr. 25, 1983 (a total of 5 pages, including Diagram #I).
A. R. Cook & J. R. Johler, report entitled *Surface Radar Tests*, sponsored by U.S. Dept. of Interior, Bureau of Mines, dated Mar. 15, 1983, a final report written under Contract No. S0221103, 26 pages.
J. R. Johler & A. R. Cook, report entitled *Surface Radar Tests*, CRPLi Report 83-1, dated Dec. 28, 1983, 26 pages.
R. King, C. W. Harrison, Jr., & D. H. Denton, Jr., "The Electrically Short Antennas as a Probe for Measuring Free Electron Densities and Collision Frequencies in an Ionized Region," *Journal of Research*, vol. 65, No. 4, Jul.-Aug. 1961, pp. 371-384.
R. King & C. W. Harrison, "Half-Wave Cylindrical Antenna in a Dissipative Medium: Current and Impedance," *Journal of Research*, vol. 64D, No. 4, Jul.-Aug. 1960, pp. 365-380.
J. R. Johler & J. C. Morgenstern, "Propagation of the Ground Wave Electromagnetic Signal, with Particular Reference to a Pulse of Nuclear Origin," *Proceedings of the IEEE*, vol. 53, No. 12, Dec. 1965, pp. 2043-2053.
J. R. Johler & L. C. Walters, "Propagation of a Ground Wave Pulse Around a Finitely Conducting Spherical Earth From a Damped Sinusoidal Source Current," *IRE Transactions On Antennas and Propagation*, vol. AP-7, No. 1, Jan. 1959.
R. W. P. King, G. S. Smith with M. Owens & T. T. Wu, "Antennas in Matter-Fundamentals, Theory, and Applications", *The MIT Presstl*, 1981, pp. 196-202.

*Primary Examiner*—John B. Sotomayor
*Attorney, Agent, or Firm*—Limbach & Limbach

[57] ABSTRACT

A method and apparatus in which a capacitor is disposed in direct contact with the earth, and a short voltage pulse is applied to the capacitor to transmit a pulse of electromagnetic radiation having a broad frequency band into the earth. In a preferred embodiment, a portion of the electromagnetic radiation that has propagated through the subsurface is detected and processed to image the subsurface. The size, L, of the transmitting capacitor should be sufficiently small to satisfy the relation Re[kL] < 1, where k is the wavenumber in the earth formation of each frequency component of radiation transmitted into the earth. In a preferred embodiment, the voltage pulse applied to the transmitting capacitor has frequency components in a broad band from below 1 MHz to above 100 MHz, and the only frequency components of the detected electromagnetic radiation that are processed to image the subsurface have frequency in the range from about 500 KHz to 25 MHz.

21 Claims, 5 Drawing Sheets

TO PULSER
OR
TO AMPLIFIER

METHOD AND APPARATUS FOR TRANSMITTING ELECTROMAGNETIC SIGNALS INTO THE EARTH FROM A CAPACITOR

FIELD OF THE INVENTION

The invention pertains to methods and apparatus for transmitting electromagnetic signals into the earth from a capacitor. The invention also pertains to geophysical exploration methods and apparatus in which electromagnetic signals are transmitted into the earth from a capacitor, and return signals that have propagated through the earth are received and processed to image the earth.

BACKGROUND OF THE INVENTION

Throughout the specification, including in the claims, the expressions "earth" and "earth formation" are used in a broad sense to denote any nonhomogeneous, dispersive medium having complex permittivity. Important examples of such media include subterranean formations such as soil, hardpan, and bedrock, and bodies of water (such as the ocean) above such subterranean formations.

Various systems have been proposed for transmitting electromagnetic signals into the earth subsurface from airborne, subsurface, and surface equipment, and for receiving and processing electromagnetic radiation that has propagated through the subsurface.

For example, U.S. Pat. No. 2,077,707, issued Apr. 20, 1937, discloses transmission of electromagnetic radiation into the earth by passing current through a coiled wire antenna, or by causing current to flow between two electrodes disposed in the earth. U.S. Pat. No. 2,077,707 teaches that after the radiation has propagated through the earth, it should be detected within one or more narrow frequency bandwidths.

U.S. Pat. No. 1,365,579, issued Jan. 11, 1921, also discloses an apparatus capable of transmitting electromagnetic radiation into the earth. U.S. Pat. No. 1,365,579 suggests the technique of impressing high frequency oscillations on bent wires embedded in the earth (wires C2 and C3 shown in FIGS. 2 and 3). Each bent wire has a pair of separated, horizontally oriented end portions.

However, it had not been known until the present invention how efficiently to transmit a short pulse of electromagnetic radiation (a broadband signal including high frequency components) into the earth, and then detect the resulting return signal (electromagnetic radiation that has propagated through the earth) and process low frequency components of the return signal to image the earth. In particular, it had not been known efficiently to transmit such broadband radiation from an efficiently designed, small, transmitting capacitor in contact with the earth, where the capacitor has small size in comparison with the wavenumber (in the earth) of each frequency component of the radiation transmitted into the earth.

The prior art has described the fields that would result in theory from such a small transmitting capacitor, in the idealized case that the capacitor is disposed in a uniform dielectric medium and driven by an ideal delta-function generator. For example, the articles by King, et al., entitled "The Electrically Short Antenna as a Probe for Measuring Free Electron Densities and Collision Frequencies in an Ionized Region," Journal of Research of the National Bureau of Standards, Vol. 65, No. 4, July-August 1961, pp. 371-384, and "Half-Wave Cylindrical Antenna in a Dissipative Medium: Current and Impedance," Journal of Research of the National Bureau of Standards, Vol. 64D, No. 4, July-August 1960, pp. 365-380, discuss the fields resulting from a cylindrical electrical probe, having length 2h and radius a, immersed in a conducting dielectric medium. King, et al. (1961) assume that $bh<1$ and $ah<1$, where "b" is the real part of the wavenumber (of radiation in the medium) and "a" is the imaginary part of the wavenumber (of radiation in the medium).

However, this prior art teaching is insufficiently sophisticated to predict the fields that would result from a transmitting capacitive probe in the very complicated case that the probe is disposed in a nonhomogeneous dispersive medium such as a subterranean formation. The prior art neither discloses nor suggests the technique of efficiently transmitting broadband electromagnetic radiation (including high frequency components) into the earth using a transmitting capacitor. Nor does the prior art suggest how to maximize the ratio of "power coupled into the earth to power coupled to the air" from a transmitting capacitor disposed on the earth surface, by appropriately selecting the size, shape, and impedance of the capacitor, and the frequency content of the transmitted signal. Nor does the prior art disclose or suggest the step of detecting a return signal that results from propagation of a broadband pulse of electromagnetic radiation from a capacitor through the earth, or the step of processing low frequency components of such a return pulse to image the earth.

SUMMARY OF THE INVENTION

The invention is a method and apparatus in which a capacitor is disposed in direct contact with the earth, and a short voltage pulse is applied to the capacitor to transmit a pulse of electromagnetic radiation having a broad frequency band into the earth. In a preferred embodiment, a portion of the electromagnetic radiation that has propagated through the subsurface is detected and processed to image the subsurface.

The size (largest dimension), L, of the transmitting capacitor should be sufficiently small to satisfy the relation $Re[kL]<1$, where k is the wavenumber in the earth of each frequency component of radiation transmitted into the earth.

In a preferred embodiment, the voltage pulse applied to the transmitting capacitor has frequency components in a broad band from below 1 MHz to above 100 MHz, and the only frequency components of the detected electromagnetic radiation that are processed to image the subsurface have frequency in the range from about 500 KHz to 25 MHz.

In a class of preferred embodiments, the capacitor includes a pair of conductive plates with their flat surfaces in direct contact with the earth, and the voltage pulse is applied across the plates. In another class of preferred embodiments, the capacitor has one conductive member in direct contact with the medium, and the voltage pulse is applied between the member and ground.

In another class of preferred embodiments, the capacitor has variable impedance, and the method of the invention includes the preliminary step of matching the impedance of the capacitor to that of the earth.

DETAILED DESCRIPTION OF THE PREFERRED EMBODIMENT

To understand the invention, it is helpful to appreciate that the propagation of electromagnetic signals in the earth is much more complicated than in the atmosphere. When an electromagnetic pulse is coupled to the earth, return pulses from depths greater than a few hundred feet in the earth seem to vanish. However, the inventor has recognized that the earth supports pulse propagation through much longer distances, and in all types of subterranean formations. Usually, pulse dispersion occurs with the result that the frequency window of a return pulse is shifted to a lower frequency regime relative to the frequency window of the originally transmitted pulse. Accordingly, unless observations are made in the proper frequency window, an observer may incorrectly conclude that a return pulse has been lost in the noise. The inventor has recognized that it is usually irrelevant to detect and process a return signal in the same frequency window as that of a transmitted pulse.

In accordance with the invention, electromagnetic pulses are efficiently coupled downward into the earth, with sufficient intensity to propagate well above the local noise level. Return pulses (resulting from propagation of the transmitted pulses through the earth) are detected. The return pulses can be processed to image the subsurface of the earth. Alternatively, telecommunication can be accomplished by modulating the transmitted pulses. Also alternatively, subsurface positioning can be performed by employing transmitters and receivers disposed at the earth surface, or in the subsurface.

Figure 1:
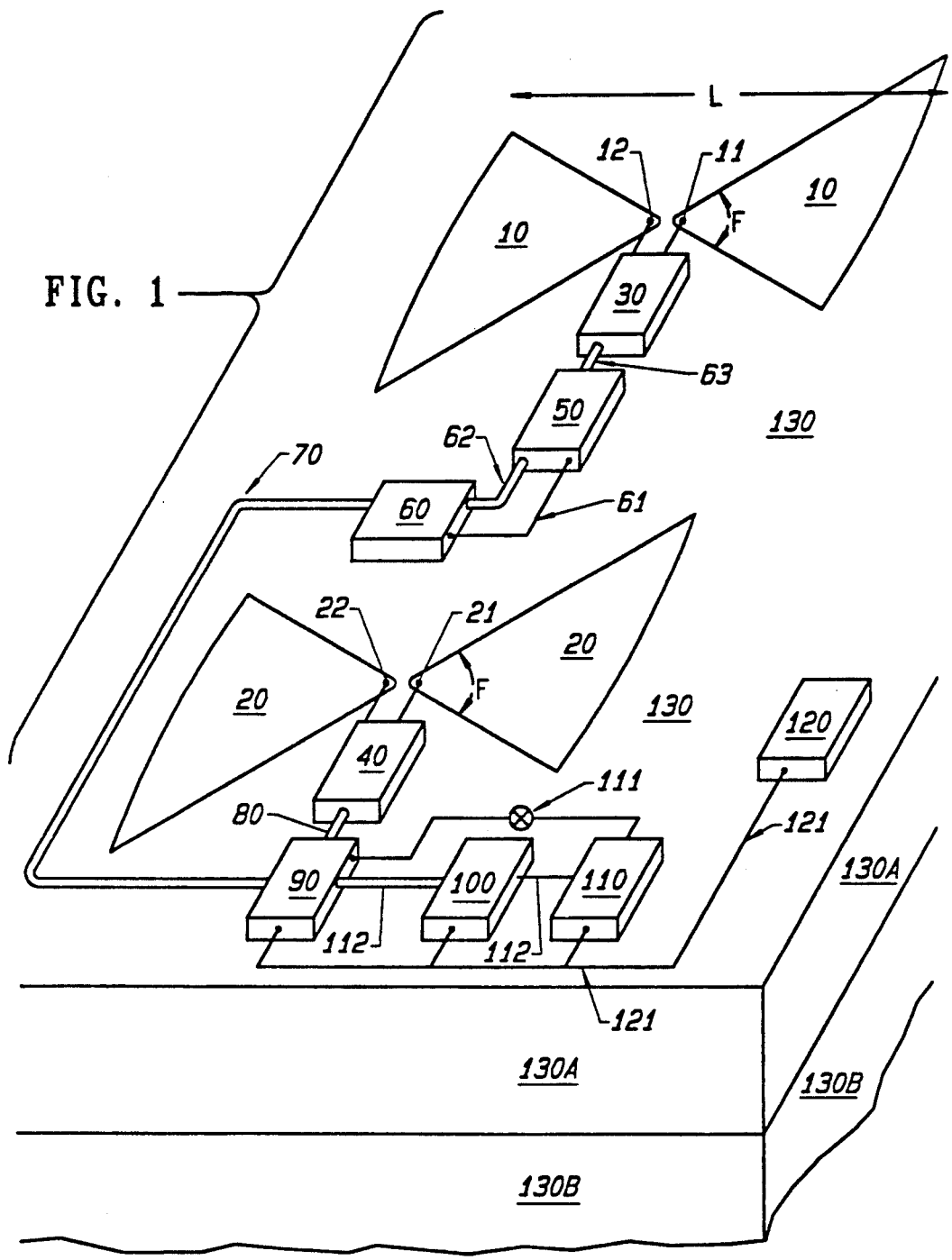
FIG. 1 is a perspective view of a preferred embodiment of the inventive apparatus.
Figure 3:
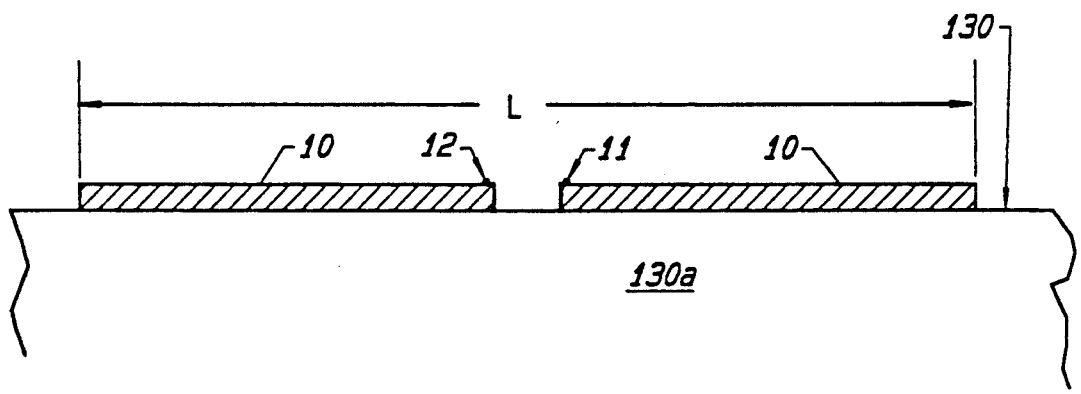
FIG. 3 is a side cross-sectional view of one of the capacitors shown in FIG. 2.

The overall arrangement of a preferred embodiment of the inventive apparatus is shown in FIG. 1. In FIG. 1, transmitting capacitor plates 10 and receiving capacitor plates 20 are disposed in direct contact with the earth surface 130. Each of plates 10 and 20 is positioned with its flat surface against earth surface 130. Pair of plates 10 has a largest dimension L in the plane of earth surface 130. Although plates 10 and 20 are shown to be identical disk sections in FIG. 1 (having identical flare angle F), they need not be identical. In one class of preferred embodiments, plates 10 and 20 are composed of uninsulated metal such as copper or brass. In another class of embodiments, plates 10 and 20 have a thin insulating coating, such as a plastic coating having thickness in the range from about one to two millimeters. Typical values for L and F are 0.5 meters and 90 degrees, respectively. As shown in FIG. 3, plates 10 are very thin in the direction perpendicular to earth surface 130. Typically, plates 10 are separated by approximately twenty to four hundred feet from plates 20.

Input terminal 11 of transmitting balun 30 (an RF impedance matching transformer) is connected to a corner of one of plates 10 and output terminal 12 of transmitting balun 30 is connected to the adjacent, inward facing corner of the other plate 10. Input terminal 21 of receiving balun 40 (an RF impedance matching transformer) is connected to a corner of one of plates 20, and output terminal 22 of receiving balun 40 is connected to the adjacent, inward facing corner of the other plate 20. In a preferred embodiment, baluns 30 and 40 are transmission line baluns.

Figure 2:
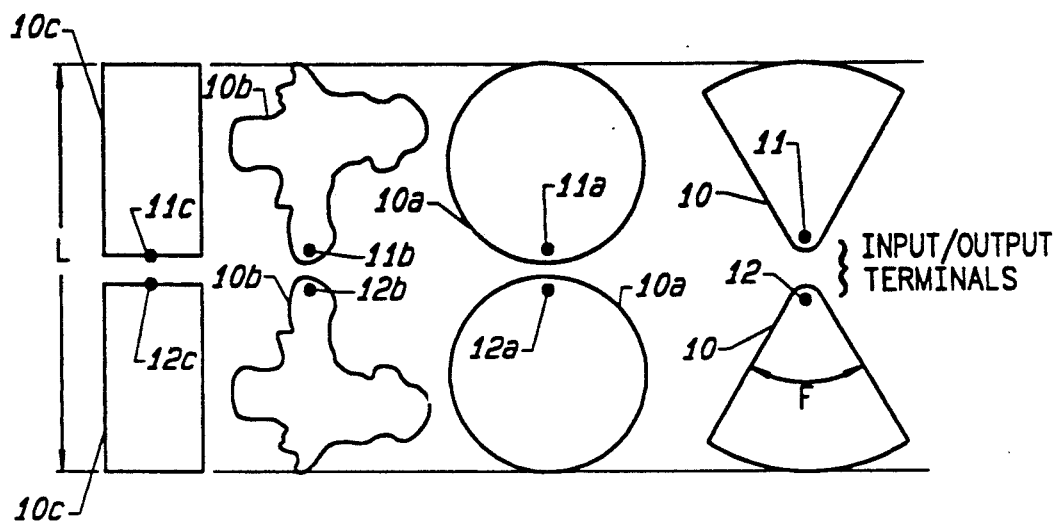
FIG. 2 is a plan view of four different capacitors, each suitable for use as a transmitting or receiving capacitor in an embodiment of the invention.

FIG. 2 is a plan view of pair of plates 10, and three alternative embodiments of transmitting plate pairs (10a, 10b, and 10c), each having largest dimension L, which are suitable for use as substitutes for pair of plates 10 or 20 in the FIG. 1 apparatus. The points of attachment of the transmitting balun input terminals to plate pairs 10a, 10b, and 10c, are indicated as 11a, 11b, and 11c, respectively, and the points of attachment of the transmitting balun output terminals to plate pairs 10a, 10b, and 10c, are indicated as 12a, 12b, and 12c, respectively. Plates 10a are disk-shaped, plates 10b have irregular shape, and plates 10c are rectangular. Other plate shapes (such as diamond shape, as in the FIG. 11 embodiment) may alternatively be employed.

With reference again to FIG. 1, terminals 11 and 12 (and terminals 21 and 22) are balanced electrically to ground, and this balance is maintained usually by balun 30 (and balun 40). Pulse generator 50 is unbalanced to ground, and balun 30 (connected between pulse generator 50 and plates 10) implements an unbalanced-to-balanced transformation enabling pulse generator 50 to apply a high voltage, short duration electrical pulse to terminals 11 and 12. Apparatus 90 is also unbalanced to ground, and includes an amplifier which is connected by short return pulse coaxial cable 80 to balun 40. Balun 40, which is connected between cable 80 and plates 20, implements an balanced-to-unbalanced transformation upon reception at plates 20 of a return pulse (which has propagated through shallow subterranean formation 130a, or both shallow subterranean formation 130a and deeper subterranean formation 130b), to enable amplifier 90 to amplify the detected return pulse.

Since formation 130a, in general, has complex permittivity and/or conductivity, and since radiation is transmitted into formation 130a upon application of a short electrical pulse to plates 10, the impedance between terminals 11 and 12 has both capacitive and resistive components. The earth surface 130 is thus placed in an electrical circuit with pulse generator 50, which typically operates at the impedance level (typically, fifty ohms) of short cable 63 which connects balun 30 and generator 50. The FIG. 1 apparatus is thus capable of coupling extremely high voltage pulses into the earth, for example, to probe the geological and tectonic structure of subterranean formations. In many subsurface imaging applications, it will suffice to couple low voltage pulses into the earth.

High voltage DC power supply and timing circuit 60 supplies synchronizing pulses to generator 50 through short coaxial cable 62, to control generation of pulses by generator 50. Circuit 60 also supplies high voltage DC power to generator through short power connection 61.

DC power supply 110 supplies DC power through short power line 112 to amplifier 90 (which includes an oscilloscope and a digitizer) and to computer and recording apparatus 100. Synchronizing pulse and DC power coaxial cable 70 connects timer/power supply apparatus 60 with apparatus 90. Portable alternator power supply 120 supplies AC power (typically, 110 volt AC power) through power line 121 to apparatuses 90, 100, and 110.

Depending upon the setting of control switch 111, apparatus 90 sends a control signal to apparatus 60 to cause apparatus 60 either to trigger or prevent pulse generation by pulse generator 50, while at the same time maintaining synchronization pulse transmission from apparatus 60 to apparatus 90 (i.e., to the oscilloscope and digitizer within apparatus 90) for purposes of sampling noise in the receiver environment. Thus, cable 70 transmits DC power, provides synchronization for the oscilloscope and digitizer, and provides on/off control information for pulse generator 50, to permit synchronized noise data collection.

Transmitting capacitor plates 10 inject a short electromagnetic pulse into formation 130a in time synchronization with a pulse supplied to balun 30 from pulse generator 50 through short coaxial cable 63. The injected pulse causes generation of a return pulse. Depending on the intensity and frequency amplitude spectrum of the injected pulse (and the separation of plates 10 and 20), the return pulse may include wavelets that have propagated through formation 130a to plates 20, Or from formation 130a into formation 130b and then back through formation 130a to plates 20. The separation between the pulse transmitting apparatus (10, 11, 12, and 30), and the pulse receiving apparatus (20, 21, 22, and 40) will typically be in the range from six to one hundred meters.

Apparatus 90 receives return pulse wavelets from balun 40, after the wavelets have been coupled from plates 20 to balun 40. The return pulse wavelets are digitized within apparatus 90 and are then processed and recorded within computer and recording apparatus 100. Apparatus 100 stores the processed data in digital form (for example, on floppy disks) for subsequent processing. Apparatus 90, 100, and 110 can conveniently be located in a motor vehicle.

Figure 4:
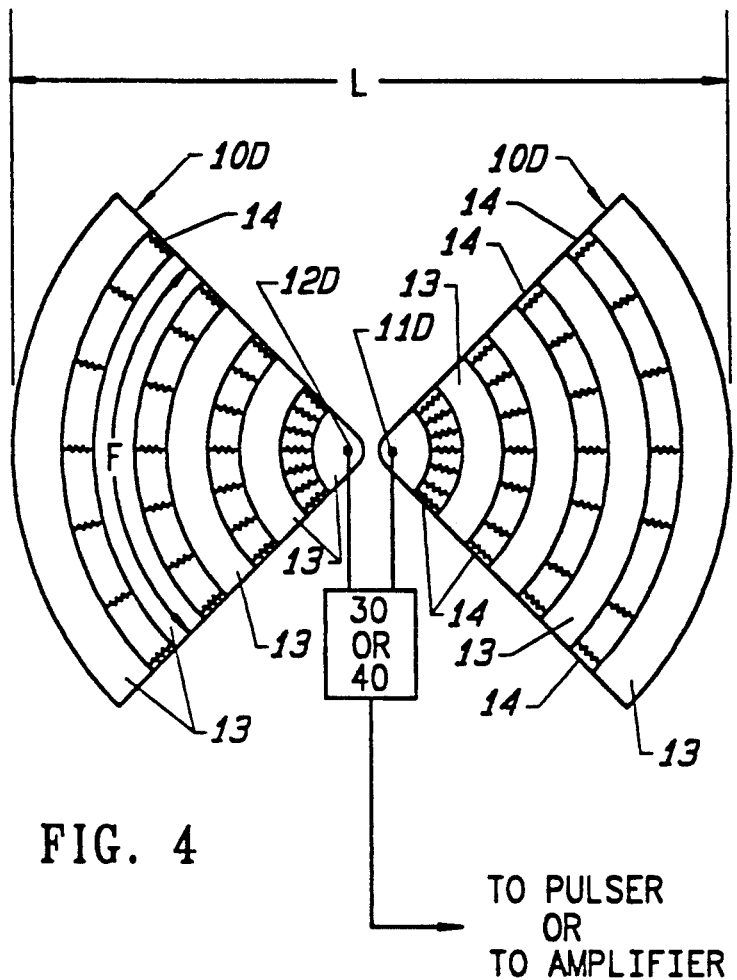
FIG. 4 is a plan view of a capacitor suitable for use as a transmitting or receiving capacitor in a preferred embodiment of the invention.

In an alternative embodiment, the transmitting capacitor includes a pair of lossy plates 10d of the type shown in FIG. 4. This embodiment is particularly useful for transmitting pulses into the earth with pulse shape suitable for shallow depth soundings. Each plate 10d includes conductive plate portions 13 separated by diffuse resistive members 14. Each of plate portions 13 is shaped as a section of an annulus (having flare angle F), except that the radially innermost plate portions 13 (to which balun input and output terminals 11d and 12d are connected) have disk section shape. For many typical geophysical applications, each resistive member 14 should have resistance in the range from about 50 to 100 ohms. Each resistive member 14 can be a composed of uniformly resistive material, or can consist of a collection of resistors connected between the adjacent plate portions 13, to achieve the desired effect on the terminal impedance.

The radially innermost plate portions 13 are connected to transmitting balun 30 when plates 10d are employed as a transmitting capacitor, and to receiving balun 40 when plates 10d are employed as a receiving capacitor.

Schematic circuit representations of several embodiments of the transmitting (or receiving) capacitor apparatus of the invention will next be described with reference to FIGS. 5-10. The capacitor element shown in each of FIGS. 5-9 can be employed as transmitting capacitor 10 in the FIG. 1 apparatus (in which case it is connected through transmitting balun 30 and coaxial cable 63 to pulse generator 50), or as receiving capacitor 20 in the FIG. 1 apparatus (in which case it is connected through receiving balun 40 and coaxial cable 80 to unit 90). To simplify the following description of FIGS. 5-9, the capacitor element in each of FIGS. 5-9 (which can include both resistive and capacitive components) will be referred to as a transmitting capacitor, and the balun connected to the capacitor element will be referred to as a transmitting balun.

Figure 5:
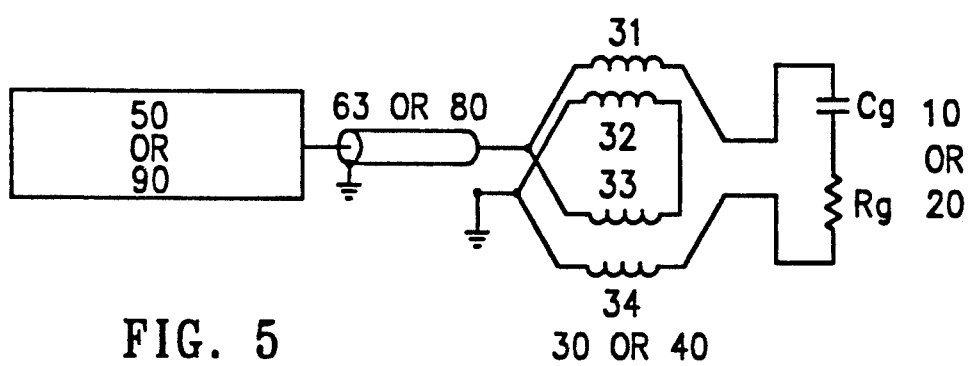
FIG. 5 is a circuit diagram representing an embodiment of a transmitting or receiving capacitor apparatus.

In FIG. 5, the terminal impedance of the transmitting capacitor has a real component (having resistance Rg at a given frequency) and an imaginary component (having capacitance Cg at a given frequency), whose values are preferably determined by the properties of the earth into which the electromagnetic pulse is to be transmitted (i.e., the real and imaginary components of the impedance of the transmitting capacitor are preferably matched to those of the earth). The transmitting balun in FIG. 5 consists of four coiled transmission lines 31, 32, 33, and 34. A typical transmission line balun of this type includes two eight turn bifilar windings on a 2.62 inch OD, Tokin 250 permeability toroid, using 14-gauge H Imideze wire. The balun is covered with tubing having a 17-mil wall composed of Teflon material.

Figure 6:
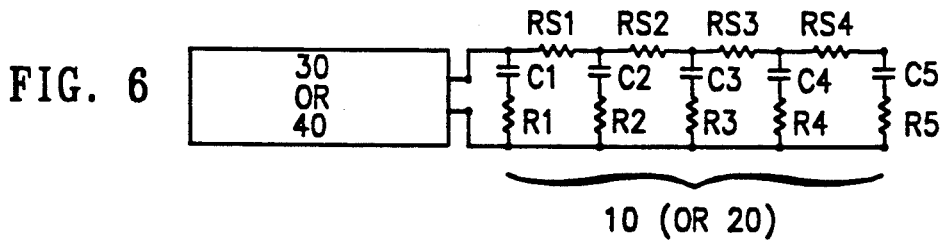
FIG. 6 is a circuit diagram representing another embodiment of a transmitting or receiving capacitor apparatus.

The transmitting capacitor of FIG. 6 corresponds to that shown in FIG. 4. Resistance R1 and capacitance C1 correspond to that of the innermost pair of plate portions 13, resistance R2 and capacitance C2 correspond to that of the next outer pair of plate portions 13, resistance R3 and capacitance C3 correspond to that of the next outer pair of plate portions 13, resistance R4 and capacitance C4 correspond to that of the next outer pair of plate portions 13, and resistance R5 and capacitance C5 correspond to that of the outermost pair of plate portions 13. Resistance RS1 corresponds to that of the radially innermost resistive member 14, resistance RS2 corresponds to that of the next outer resistive member 14, resistance RS3 corresponds to that of the next outer resistive member 14, and resistance RS4 corresponds to that of the outermost resistive member 14. All these values are preferably determined by the properties of the eart into which the electromagnetic pulse is to be transmitted (i.e., the resistive and capacitive components of the impedance of the transmitting capacitor are preferably matched to those of the earth).

Figure 7:
FIG. 7 is a simplified circuit diagram representing the apparatus of FIG. 6.

The circuit of FIG. 7 is equivalent to that of FIG. 6, so that the transmitting capacitor of FIG. 7 also corresponds to that of FIG. 4. Resistance Rt and capacitance Ct in FIG. 7 represent, respectively, the total resistance and capacitance of the FIG. 6 circuit.

Figure 8:
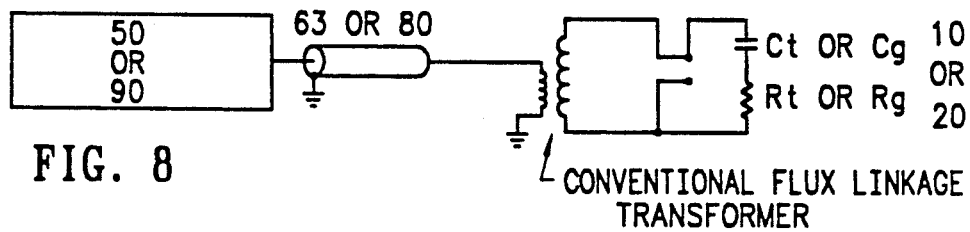
FIG. 8 is a circuit diagram representing another embodiment of a transmitting or receiving capacitor apparatus.

The transmitting balun in FIG. 8 is a conventional flux linkage transformer, which is much less efficient at the lower frequency portion of the spectrum of the transmitted pulse than is the transformer of FIG. 5.

Figure 9:
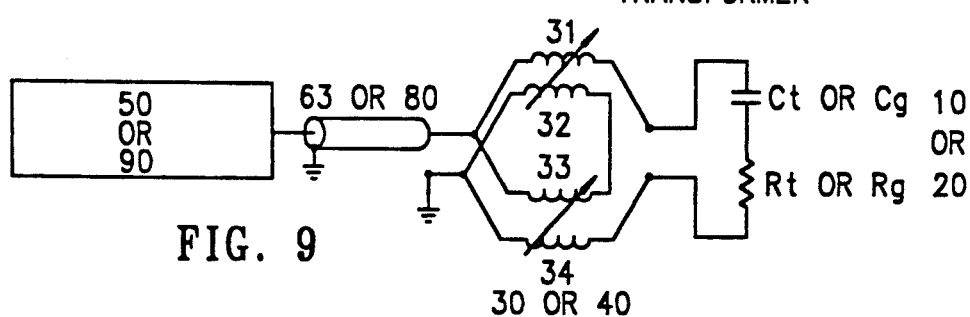
FIG. 9 is a circuit diagram representing another embodiment of a transmitting or receiving capacitor apparatus.

The transmitting balun in FIG. 9 is a transmission line balun identical to that of FIG. 5, except that it includes a variable high pass filter (for controlling the frequency bandwidth of the short voltage pulse applied to the transmitting capacitor). The variable high pass filter can be implemented by including in the balun a means for moving the core with respect to the coiled transmission line windings.

Figure 10:
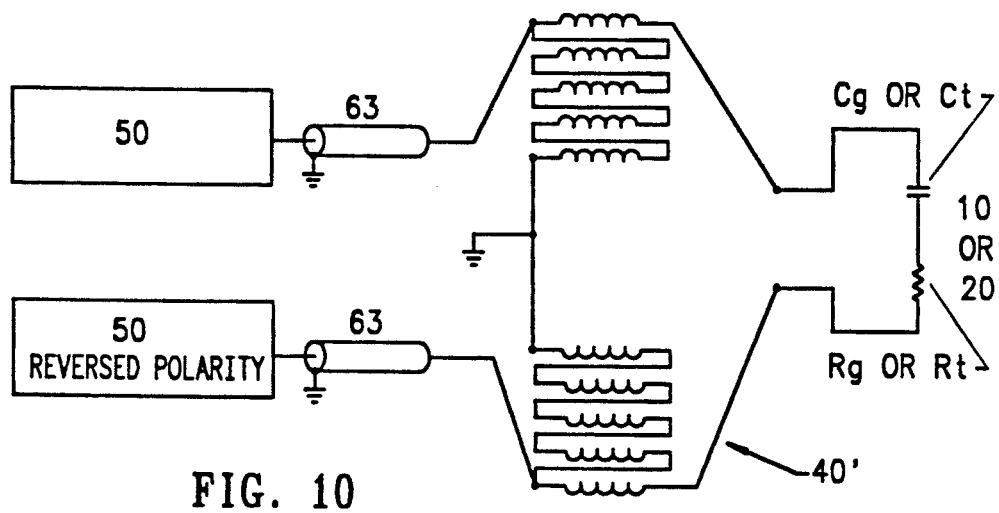
FIG. 10 is a circuit diagram representing another embodiment of a transmitting or receiving capacitor apparatus.

Pulse generator 50 of the FIG. 10 embodiment includes a means for simultaneously asserting two voltage pulses. The voltage pulses are identical, except that they have opposite polarity. Transformer 40' (between coaxial cables 63 and the transmitting capacitor) is a transmission line unbalanced to unbalanced transformer (sometimes referred to as an "unun"), rather than a balun as in the embodiments of FIGS. 5-9.

In the embodiments of FIGS. 8, 9, and 10, the impedance of the transmitting capacitor has a real component (having resistance Rg as in FIG. 5 or resistance Rt as in FIG. 7) and an imaginary component (having capacitance Cg as in FIG. 5 or capacitance Ct as in FIG. 7).

The inventor has found that the efficiency of energy transfer from a transmitting capacitor into the earth can be increased by increasing the ratio of the capacitor's surface area in direct contact with the earth to the capacitor's total surface area. Thus, the ratio of "power coupled into the earth to power coupled to the air" from a transmitting capacitor disposed on the earth surface is increased by increasing the ratio of the capacitor's surface area in direct contact with the earth to the capacitor's total surface area.

Figure 11:
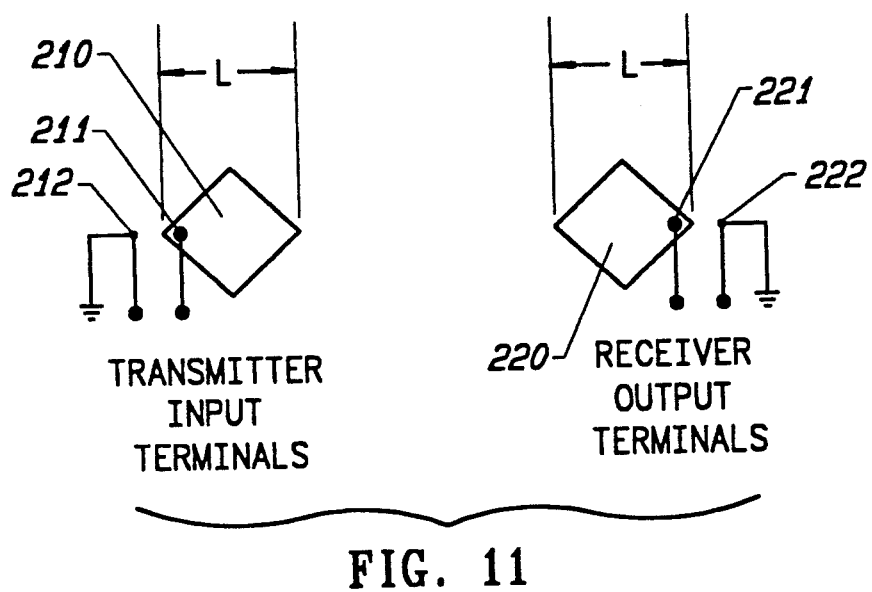
FIG. 11 is a set of diagrams representing alternative embodiments of transmitting and receiving capacitor apparatus useful in implementing the invention.

FIG. 11 is a plan view of an alternative embodiment of a transmitting capacitor and a receiving capacitor that can be used to implement the invention. Transmitter plate 210 can be uninsulated metal (such as brass) or metal having an insulating coating (such as a thin layer of plastic). The transmitting balun input terminal 211 is attached to a corner of plate 210, and the transmitting balun output terminal 212 is grounded. The roles of the transmitting balun input and output terminals can be reversed. Plate 210 has a largest dimension L, that is sufficiently small to satisfy the relation $Re[kL] < 1$, where k is the wavenumber in the earth of radiation transmitted into the earth from the transmitting capacitor (i.e., the combination of plate 210 and terminals 211 and 212).

Similarly, receiver plate 220 can be uninsulated or insulated metal, and has a largest dimension L, that is sufficiently small to satisfy the relation $Re[kL] < 1$, where k is the wavenumber in the earth of radiation transmitted into the earth from the transmitting capacitor. The receiving balun input terminal 221 is attached to a corner of plate 220, and the receiving balun output terminal 222 is grounded. The roles of the receiving balun input and output terminals can be reversed.

In the inventive apparatus (for example, in the FIG. 1 apparatus) all transmission lines and cables used for transmitting RF signals should be kept as short as possible (to minimize phase distortion effects, particularly at lower frequencies), and they should be connected to the other system components by high quality connections of the high fidelity type. It is less critical to minimize the length of synchronizing pulse cable 70, but the length of this cable, too, is preferably minimized as a matter of good engineering practice. The arrangement of system components in FIG. 1 permits minimization of the length of all transmission lines and cables used for transmitting RF signals.

The size, L, of the transmitting capacitor in each embodiment of the invention should be sufficiently small to satisfy the relation $Re[kL] < 1$, where k is the wavenumber in the earth of radiation transmitted into the earth from the capacitor. The wavenumber k depends on both the intrinsic properties of the medium, and on the frequency of the radiation which propagates in the earth in response to the voltage pulse. Since such radiation will include a broad range of frequency components, the relation $Re[kL] < 1$ should be satisfied for each frequency component of the transmitted radiation. If size L is too small, the radiation resistance of the transmitting capacitor may be too small to efficiently transmit radiation into the earth.

In a preferred embodiment, the voltage pulse applied to a transmitting capacitor (preferably having size on the order of 0.5 meter) has frequency components in a broad band from below 1 MHz to above 100 MHz, and the only frequency components of the detected electromagnetic radiation that are processed to image the subsurface have frequency in the range from about 500 KHz to 25 MHz. The low frequency limit (of the detected radiation frequency components that are processed) depends on the properties (such as dielectric constant) of the earth formation in contact with the transmitting capacitor, but 500 KHz is a typical value. The high frequency limit (of the detected radiation frequency components that are processed) also depends on the properties of the earth formation in contact with the transmitting capacitor, although 25 MHz is a typical value. Preferably, the high frequency limit is experimentally determined to be the maximum frequency that will propagate through the earth from the transmitting capacitor to the receiving capacitor. The sampling frequency associated with the digitizer within apparatus 90 should be at least twice the high frequency limit, to avoid aliasing problems.

The intensity of the short voltage pulse applied to the transmitting capacitor can be controlled to vary the penetration depth in the earth of the transmitted electromagnetic radiation. Greater penetration depths can be achieved using voltage pulses having greater intensity.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for transmitting an electromagnetic signal through an earth formation, including the steps of:
    (a) disposing capacitor plates having a largest dimension L, in direct contact with the earth formation to form an earth capacitor comprising the plates and a region of the earth formation near the plates;
    (b) applying a short voltage pulse across the capacitor plates to transmit electromagnetic radiation into the earth formation, wherein for each frequency component of the electromagnetic radiation, the largest dimension L satisifies the relation Re[k-

L]<1, where k is the wavenumber in the earth formation of said frequency component, wherein the short voltage pulse has frequency components in a broad band extending from below 1 MHz to above 100 MHz;

(c) detecting electromagnetic radiation that has propagated through the earth formation in response to application of the short voltage pulse; and (d) processing only frequency components of the detected electromagnetic radiation, in a frequency window having an upper frequency less than 25 MHz, which have propagated into the earth formation to a penetration depth much greater than on the order of several hundred feet to image the earth formation.

2. The method of claim 1, also including the step of controlling the intensity of the short voltage pulse applied during step (b), to transmit the electromagnetic radiation to a desired penetration depth in the earth formation.

3. The method of claim 1, wherein only frequency components of the detected electromagnetic radiation having frequency greater than 500 KHz are processed during step (d).

4. The method of claim 1, wherein each of the plates has a flat surface in direct contact with the earth formation.

5. An apparatus for transmitting an electromagnetic signal through an earth formation, including:
   a capacitor assembly having a largest dimension L, disposed in direct contact with the earth formation to form an earth capacitor comprising the capacitor assembly and a region of the earth formation near said capacitor assembly;
   a means for applying a short voltage pulse to the capacitor assembly to transmit electromagnetic radiation into the earth formation, wherein for each frequency component of the electromagnetic radiation, the largest dimension L satisifes the relation Re[kL]<1, where k is the wavenumber in the earth formation of said frequency component, wherein the short voltage pulse has frequency components in a broad band extending from below 1 MHz to above 100 MHz; and
   a means for detecting electromagnetic radiation that has propagated through the earth formation in response to application of the short voltage pulse, including means for processing only frequency components of the detected electromagnetic radiation, in a frequency window having an upper frequency less than 25 MHz, which have propagated into the earth formation to a penetration depth much greater than on the order of several hundred feet.

6. The apparatus of claim 5, wherein the means for detecting electromagnetic radiation includes a receiving capacitor disposed adjacent the earth formation at a location spaced from the capacitor assembly.

7. The apparatus of claim 5, also including a means for processing the detected electromagnetic radiation to image the earth formation.

8. The apparatus of claim 5, wherein the capacitor assembly includes a pair of conductive plates in direct contact with the earth formation, and wherein the means for applying the short voltage pulse applies the voltage pulse across the plates.

9. The apparatus of claim 5, wherein the capacitor assembly includes a single conductive plate in direct contact with the earth formation, and wherein the means for applying the short voltage pulse applies the voltage pulse between the plate and ground.

10. The apparatus of claim 5, wherein the capacitor assembly includes at least one uninsulated conductive plate in direct contact with the earth formation.

11. The apparatus of claim 5, wherein the capacitor assembly includes at least one insulated conductive plate having an electrically insulated surface in direct contact with the earth formation.

12. The apparatus of claim 5, wherein the capacitor assembly includes at least one lossy plate in direct contact with the earth formation.

13. The apparatus of claim 12, wherein the lossy plate includes at least two conductive plate portions and a resistive portion connected between a pair of the conductive plate portions.

14. The apparatus of claim 5, wherein the means for imaging the earth formation includes means for processing only frequency components of the detected electromagnetic radiation having frequency greater than about 500 KHz.

15. The apparatus of claim 5, wherein the means for applying a short voltage pulse to the capacitor assembly includes:
   a pulse generator; and
   a transmission line balun connected between the pulse generator and the capacitor assembly.

16. The apparatus of claim 15, wherein the transmission line balun includes a variable high pass filter means for controlling the frequency bandwidth of the short voltage pulse applied to the capacitor assembly.

17. The apparatus of claim 5, wherein the means for applying a short voltage pulse to the capacitor assembly includes:
   a pulse generator; and
   a transmission line unbalanced to unbalanced transformer connected between the pulse generator and the capacitor assembly, wherein the pulse generator includes a means for simultaneously asserting two opposite-polarity voltage signals to the transmission line unbalanced to unbalanced transformer.

18. A method for transmitting an electromagnetic signal through an earth formation, including the steps of:
   (a) disposing capacitor plates having a largest dimension L, in direct contact with the earth formation to form an earth capacitor comprising the plates and a region of the earth formation near the plates;
   (b) applying a short voltage pulse between the capacitor plate and ground to transmit electromagnetic radiation into the earth formation, wherein for each frequency component of the electromagnetic radiation, the largest dimension L satisifies the relation Re[kL]<1, where k is the wavenumber in the earth formation of said frequency component, wherein the short voltage pulse has frequency components in a broad band extending from below 1 MHz to above 100 MHz;
   (c) detecting electromagnetic radiation that has propagated through the earth formation in response to application of the short voltage pulse; and
   (d) processing only frequency components of the detected electromagnetic radiation, in a frequency window having an upper frequency less than 25 MHz, which have propagated into the earth formation to a penetration depth much greater than the largest dimension L.

19. The method of claim 18, wherein step (d) includes the operation of identifying frequency components of the detected electromagnetic radiation which have propagated into the earth formation to a penetration depth much greater than on the order of several hundred feet.

20. An apparatus for transmitting an electromagnetic signal through an earth formation, including:
- a capacitor assembly having a largest dimension L, disposed in direct contact with the earth formation to form an earth capacitor comprising the capacitor assembly and a region of the earth formation near said capacitor assembly;
- a means for applying a short voltage pulse to the capacitor assembly to transmit electromagnetic radiation into the earth formation, wherein for each frequency component of the electromagnetic radiation, the largest dimension L satisifes the relation $Re[kL] < 1$, where k is the wavenumber in the earth formation of said frequency component; and
- a means for detecting electromagnetic radiation that has propagated through the earth formation in response to application of the short voltage pulse, including means for identifying frequency components of the detected electromagnetic radiation in a frequency window which have propagated into the earth formation to a penetration depth much greater than on the order of several hundred feet, wherein the means for applying the short voltage pulse to the capacitor assembly includes:
- a pulse generator; and
- a transmission line balun connected between the pulse generator and the capacitor assembly.

21. The apparatus of claim 20, wherein the transmission line balun includes a variable high pass filter means for controlling the frequency bandwidth of the short voltage pulse applied to the capacitor assembly.

* * * * *